(12) United States Patent
Clasen et al.

(10) Patent No.: US 11,558,672 B1
(45) Date of Patent: Jan. 17, 2023

(54) SYSTEM FOR PROVIDING NEW CONTENT RELATED TO CONTENT CURRENTLY BEING ACCESSED

(71) Applicant: Cox Communications, Inc., Atlanta, GA (US)

(72) Inventors: Daniel Clasen, Fayetteville, GA (US); Lior Koren, Sudbury, MA (US); Franco Morales, Woodstock, GA (US); Carson Banov, Vero Beach, FL (US); Shubh Singhi, Johns Creek, GA (US); Joshua Edward Fierstein, Clearwater, FL (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 13/681,055

(22) Filed: Nov. 19, 2012

(51) Int. Cl.
*H04N 21/61* (2011.01)
(52) U.S. Cl.
CPC .................................. *H04N 21/61* (2013.01)
(58) Field of Classification Search
CPC ........... H04N 21/436; H04N 21/44204; H04N 21/44213; H04N 21/44222; H04N 21/4437; H04N 21/4438; H04N 21/4532; H04N 21/4622
USPC ............................ 725/25, 78, 109–110, 9, 46
See application file for complete search history.

(56) References Cited

U.S. PATENT DOCUMENTS

| | | | |
|---|---|---|---|
| 6,177,931 B1 * | 1/2001 | Alexander et al. ............. 725/52 |
| 6,298,482 B1 * | 10/2001 | Seidman ............ H04N 5/44543 348/E5.105 |
| 6,704,804 B1 * | 3/2004 | Wilson et al. ................. 719/315 |
| 8,200,826 B1 * | 6/2012 | Fleischman .................... 709/227 |
| 8,230,059 B1 * | 7/2012 | Santos ................ G06F 11/3466 718/1 |
| 8,307,395 B2 * | 11/2012 | Issa .................... G06F 17/30817 709/219 |
| 8,352,980 B2 * | 1/2013 | Howcroft ........... H04N 21/2668 725/34 |
| 8,621,509 B2 * | 12/2013 | Jeong et al. .................... 725/38 |
| 8,789,105 B2 * | 7/2014 | Filippov ............ H04N 5/44543 725/44 |
| 8,839,306 B2 * | 9/2014 | Roberts .............. H04N 7/17318 725/11 |
| 8,949,873 B1 * | 2/2015 | Bayer .............. H04N 21/44222 725/14 |
| 9,363,464 B2 * | 6/2016 | Alexander ......... H04N 21/4335 |
| 9,363,470 B2 * | 6/2016 | Jeong .................... G06F 3/0487 |

(Continued)

*Primary Examiner* — An Son P Huynh
(74) *Attorney, Agent, or Firm* — Merchant & Gould P.C.

(57) ABSTRACT

A virtual communication bus for sharing information between applications is provided. When a user accesses media content on a television or content via an application on a virtual communication bus, data associated with the media content or the application content may be stored in a communal memory in a standard format, and may be accessed by one or more other applications on the virtual communication bus. The data may include data associated with interactions between the user and an application and interaction between applications. The data may be utilized to determine relevant information to provide the user. When a user accesses another application (on a same or another device), information determined to be relevant to the user may be provided. Data may be stored and shared between applications on the virtual communication bus.

20 Claims, 9 Drawing Sheets

(56) References Cited

U.S. PATENT DOCUMENTS

| | | | |
|---|---|---|---|
| 9,414,120 B2* | 8/2016 | Nishimura | H04N 21/4126 |
| 2001/0001160 A1* | 5/2001 | Shoff et al. | 725/51 |
| 2002/0056087 A1* | 5/2002 | Berezowski | G06Q 30/02 |
| | | | 725/9 |
| 2002/0174430 A1* | 11/2002 | Ellis et al. | 725/46 |
| 2002/0194620 A1* | 12/2002 | Zdepski | 725/138 |
| 2003/0086694 A1* | 5/2003 | Davidsson | H04N 21/47 |
| | | | 386/213 |
| 2003/0149988 A1* | 8/2003 | Ellis et al. | 725/87 |
| 2004/0133909 A1* | 7/2004 | Ma | G06Q 30/0207 |
| | | | 725/34 |
| 2005/0028208 A1* | 2/2005 | Ellis et al. | 725/58 |
| 2005/0149964 A1* | 7/2005 | Thomas | G06Q 30/02 |
| | | | 725/9 |
| 2005/0160458 A1* | 7/2005 | Baumgartner | 725/46 |
| 2005/0166142 A1* | 7/2005 | Mise | G06Q 30/00 |
| | | | 715/246 |
| 2005/0251823 A1* | 11/2005 | Saarikivi | H04H 20/28 |
| | | | 725/42 |
| 2005/0278741 A1* | 12/2005 | Robarts et al. | 725/46 |
| 2006/0271687 A1* | 11/2006 | Alston et al. | 709/227 |
| 2006/0287912 A1* | 12/2006 | Raghuvamshi | G06Q 30/02 |
| | | | 705/14.4 |
| 2007/0104369 A1* | 5/2007 | Weatherhead | H04H 60/45 |
| | | | 382/181 |
| 2007/0136753 A1* | 6/2007 | Bovenschulte | H04H 60/31 |
| | | | 725/46 |
| 2007/0154163 A1* | 7/2007 | Cordray | H04N 21/4755 |
| | | | 386/278 |
| 2007/0157237 A1* | 7/2007 | Cordray et al. | 725/42 |
| 2007/0157242 A1* | 7/2007 | Cordray | H04H 60/33 |
| | | | 725/46 |
| 2007/0157260 A1* | 7/2007 | Walker | H04N 7/163 |
| | | | 725/86 |
| 2007/0157281 A1* | 7/2007 | Ellis et al. | 725/134 |
| 2007/0198976 A1* | 8/2007 | Leis et al. | 718/1 |
| 2008/0052514 A1* | 2/2008 | Nakae | G06F 21/6218 |
| | | | 713/168 |
| 2008/0092156 A1* | 4/2008 | Ferrone | H04H 60/33 |
| | | | 725/13 |
| 2008/0122796 A1* | 5/2008 | Jobs | G06F 3/0488 |
| | | | 345/173 |
| 2008/0127253 A1* | 5/2008 | Zhang | H04N 21/478 |
| | | | 725/35 |
| 2008/0201731 A1* | 8/2008 | Howcroft | H04H 60/46 |
| | | | 725/13 |
| 2008/0243901 A1* | 10/2008 | Super | G06F 8/35 |
| 2008/0285940 A1* | 11/2008 | Kulas | 386/52 |
| 2008/0294636 A1* | 11/2008 | Kim | 707/6 |
| 2009/0063994 A1* | 3/2009 | Pickelsimer | G06F 17/30017 |
| | | | 715/753 |
| 2009/0092374 A1* | 4/2009 | Kulas | H04N 7/173 |
| | | | 386/248 |
| 2009/0100361 A1* | 4/2009 | Abello | H04N 5/4403 |
| | | | 715/764 |
| 2009/0100363 A1* | 4/2009 | Pegg | G06F 3/04817 |
| | | | 715/765 |
| 2009/0131764 A1* | 5/2009 | Lee | A61B 5/6803 |
| | | | 600/301 |
| 2009/0133051 A1* | 5/2009 | Hildreth | H04N 21/4223 |
| | | | 725/28 |
| 2009/0133070 A1* | 5/2009 | Hamano | G06F 21/6218 |
| | | | 725/46 |
| 2009/0138805 A1* | 5/2009 | Hildreth | G06K 9/00335 |
| | | | 715/745 |
| 2009/0138906 A1* | 5/2009 | Eide et al. | 725/32 |
| 2009/0164460 A1* | 6/2009 | Jung et al. | 707/5 |
| 2009/0276805 A1* | 11/2009 | Andrews II | H04N 21/2547 |
| | | | 725/35 |
| 2009/0327094 A1* | 12/2009 | Elien | G06F 21/6218 |
| | | | 705/26.1 |
| 2010/0004993 A1* | 1/2010 | Troy | G06Q 30/02 |
| | | | 705/14.51 |
| 2010/0095345 A1* | 4/2010 | Tran et al. | 725/131 |
| 2010/0122305 A1* | 5/2010 | Moloney | G06F 21/10 |
| | | | 725/93 |
| 2010/0153885 A1* | 6/2010 | Yates | G06F 3/0482 |
| | | | 715/841 |
| 2010/0205628 A1* | 8/2010 | Davis | H04M 1/72533 |
| | | | 725/25 |
| 2010/0229197 A1* | 9/2010 | Yi et al. | 725/40 |
| 2010/0251292 A1* | 9/2010 | Srinivasan | H04H 20/57 |
| | | | 725/37 |
| 2010/0262995 A1* | 10/2010 | Woods | G06T 15/20 |
| | | | 725/40 |
| 2011/0072452 A1* | 3/2011 | Shimy | H04N 7/163 |
| | | | 725/25 |
| 2011/0078717 A1* | 3/2011 | Drummond et al. | 725/14 |
| 2011/0078724 A1* | 3/2011 | Mehta | G06Q 30/02 |
| | | | 725/32 |
| 2011/0078731 A1* | 3/2011 | Nishimura | G06F 9/4446 |
| | | | 725/39 |
| 2011/0088075 A1* | 4/2011 | Eyer | H04N 5/44508 |
| | | | 725/114 |
| 2011/0107374 A1* | 5/2011 | Roberts | H04N 21/25833 |
| | | | 725/46 |
| 2011/0138408 A1* | 6/2011 | Adimatyam | H04H 60/372 |
| | | | 725/14 |
| 2011/0145867 A1* | 6/2011 | Lee | H04H 60/43 |
| | | | 725/61 |
| 2011/0154200 A1* | 6/2011 | Davis | H04N 21/235 |
| | | | 715/716 |
| 2011/0154399 A1* | 6/2011 | Jin | H04N 21/44213 |
| | | | 725/46 |
| 2011/0164175 A1* | 7/2011 | Chung | H04N 21/4126 |
| | | | 348/468 |
| 2011/0185437 A1* | 7/2011 | Tran | H04L 63/104 |
| | | | 726/28 |
| 2011/0231872 A1* | 9/2011 | Gharachorloo | H04N 21/4126 |
| | | | 725/28 |
| 2011/0247044 A1* | 10/2011 | Jacoby | H04H 60/43 |
| | | | 725/115 |
| 2011/0282906 A1* | 11/2011 | Wong | G06F 17/30831 |
| | | | 707/780 |
| 2011/0310305 A1* | 12/2011 | Alexander | H04N 21/4135 |
| | | | 348/725 |
| 2011/0314004 A1* | 12/2011 | Mehta | G06F 16/40 |
| | | | 707/723 |
| 2011/0314071 A1* | 12/2011 | Johnson | G06F 16/13 |
| | | | 707/827 |
| 2012/0050619 A1* | 3/2012 | Kitazato | H04N 21/4882 |
| | | | 348/723 |
| 2012/0110621 A1* | 5/2012 | Gossweiler, III | H04N 21/488 |
| | | | 725/46 |
| 2012/0117057 A1* | 5/2012 | Adimatyam et al. | 707/723 |
| 2012/0120296 A1* | 5/2012 | Roberts | H04N 21/4126 |
| | | | 348/333.12 |
| 2012/0174159 A1* | 7/2012 | Arte | H04N 21/2668 |
| | | | 725/46 |
| 2012/0191832 A1* | 7/2012 | Kim | H04L 12/2812 |
| | | | 709/223 |
| 2012/0197930 A1* | 8/2012 | Newell | G06F 17/3082 |
| | | | 707/769 |
| 2012/0227073 A1* | 9/2012 | Hosein et al. | 725/60 |
| 2012/0278331 A1* | 11/2012 | Campbell | H04N 21/44204 |
| | | | 707/740 |
| 2012/0304229 A1* | 11/2012 | Choi | H04N 21/4821 |
| | | | 725/38 |
| 2012/0324507 A1* | 12/2012 | Weber | H04H 20/38 |
| | | | 725/37 |
| 2013/0007807 A1* | 1/2013 | Grenville | H04N 21/4314 |
| | | | 725/44 |
| 2013/0016910 A1* | 1/2013 | Murata | H04N 21/8583 |
| | | | 382/195 |
| 2013/0027613 A1* | 1/2013 | Kim | H04N 21/4126 |
| | | | 348/563 |

(56) References Cited

U.S. PATENT DOCUMENTS

| | | | |
|---|---|---|---|
| 2013/0031582 A1* | 1/2013 | Tinsman | H04N 21/2353 725/36 |
| 2013/0036200 A1* | 2/2013 | Roberts | H04L 65/4076 709/219 |
| 2013/0036442 A1* | 2/2013 | Wingert | H04N 21/42209 725/60 |
| 2013/0061262 A1* | 3/2013 | Briggs | H04N 21/8547 725/32 |
| 2013/0067331 A1* | 3/2013 | Glazer | H04L 65/1069 715/719 |
| 2013/0076853 A1* | 3/2013 | Diao | H04N 7/157 348/14.08 |
| 2013/0091515 A1* | 4/2013 | Sakata | H04N 17/04 725/10 |
| 2013/0093786 A1* | 4/2013 | Tanabe | H04N 5/76 345/619 |
| 2013/0167168 A1* | 6/2013 | Ellis | H04N 21/25891 725/12 |
| 2013/0173765 A1* | 7/2013 | Korbecki | H04N 21/42209 709/221 |
| 2013/0205314 A1* | 8/2013 | Ramaswamy | H04N 21/44218 725/14 |
| 2013/0282755 A1* | 10/2013 | Procopio | G06F 16/148 707/E17.014 |
| 2014/0067828 A1* | 3/2014 | Archibong | H04L 65/4084 707/748 |

* cited by examiner

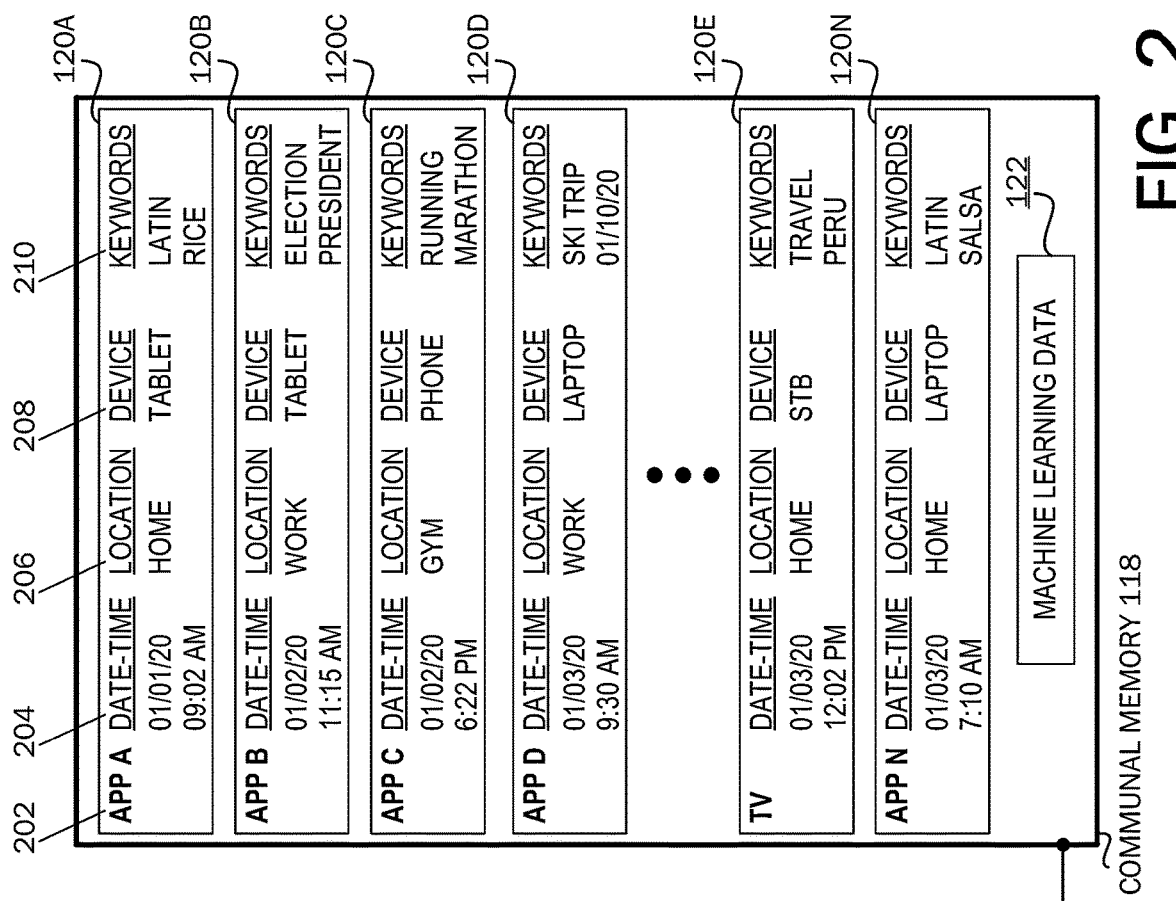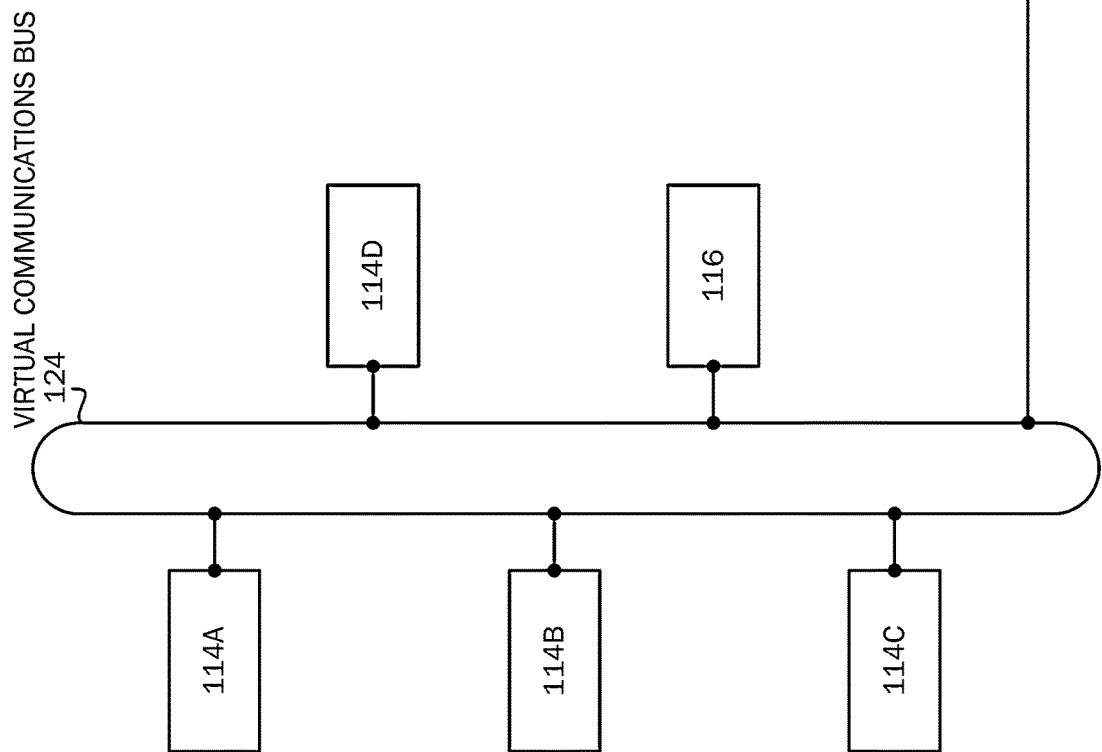
FIG. 2

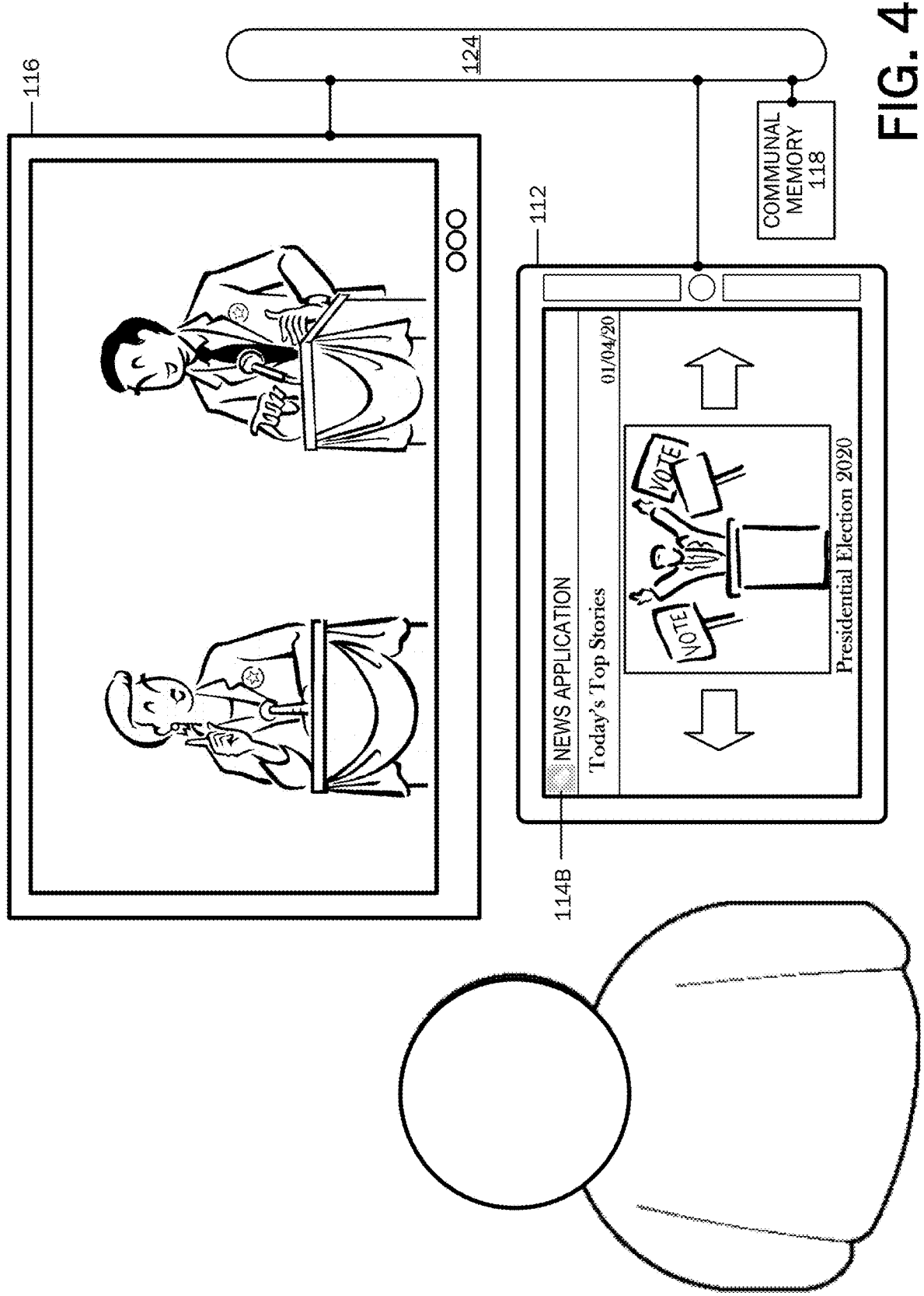

SYSTEM FOR PROVIDING NEW CONTENT RELATED TO CONTENT CURRENTLY BEING ACCESSED

BACKGROUND

Oftentimes, users interact with multiple devices at the same time. For example, many users utilize a smart phone, tablet computing device, or other type of computing device while watching television. While watching a television program, a user may find a subject of interest and may use another device to learn more about the subject of interest, or an application that is determined to be related to content a user is watching may be presented to a user on an interactive television.

Currently, a standardized way for applications to communicate with each other and with a television does not exist. It is with respect to these and other considerations that the present invention has been made.

SUMMARY

Embodiments of the present invention provide a standard framework for an application to communicate with other applications and to receive relevant information from the other applications.

An application may communicate with one or more other applications, including a television application, to provide information determined to be relevant to a user. According to embodiments, relevant information may include passive knowledge, suggestions and/or recommendations to the user. An application may receive data associated with media content a user is watching on a television and may update itself to provide information relevant to the media content. Additionally, an application may receive data associated with how a user interacts with other applications and may update itself accordingly. For example, if a user is watching a program about France on a television and subsequently selects an application on the television or on another computing device, the application may automatically provide information about France when selected by the user.

The one or more applications, including the television application, may be located inside a virtual communication bus platform and store data in a communal memory bank in a standard format.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Referring now to the drawings in which like reference numbers represent corresponding parts throughout:

FIG. 2 is a simplified block diagram illustrating a communal memory according to an embodiment;

FIG. 4 illustrates an example of sharing of information between a television and a news application;

DETAILED DESCRIPTION

Figure 1:
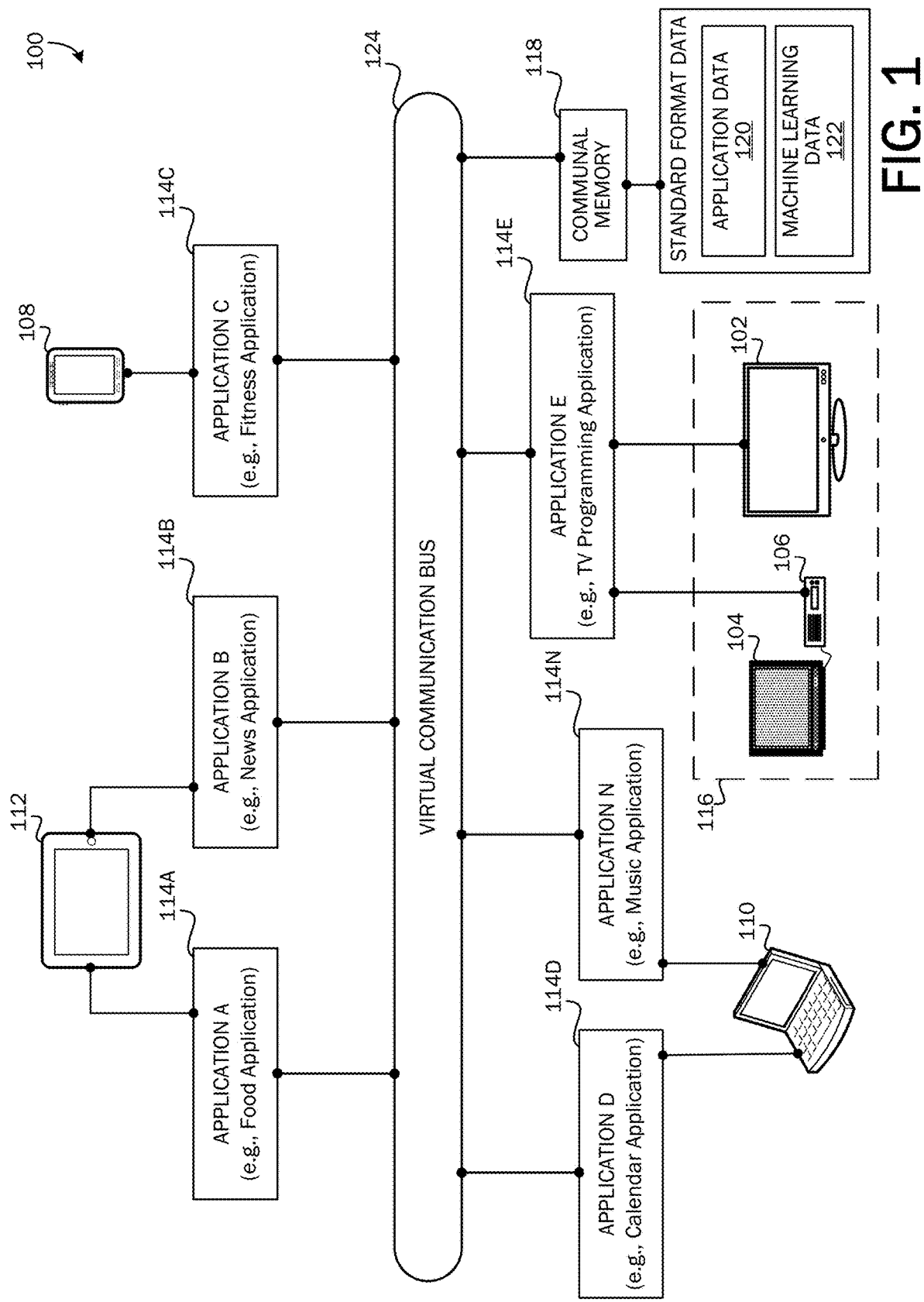
FIG. 1 is a simplified block diagram of an exemplary system that provides a virtual communication bus according to an embodiment.

Embodiments of the present invention are directed to providing a virtual communication bus for sharing information between applications. According to embodiments, when a user accesses media content on a television or an application on a virtual communication bus, data associated with the media content or the application may be stored in a communal memory in a standard format. The stored data may be accessed by one or more other applications on the virtual communication bus and may be utilized to determine relevant information to provide the user. When a user selects another one of the one or more other applications, information determined to be relevant to the user may be provided. The one or more applications may be provided on a same device the user accesses the media content or the first application, or alternatively, may be provided on another device. Data may be stored and shared between applications on the virtual communication bus. Because the data is stored in a standard format, any of the one or more applications may access and read the data to provide relevant information to the user. For example, data associated with a user watching a television show about skiing may be stored and shared. Accordingly, an application may automatically provide an Internet search for lift tickets at nearby ski resorts, resort deals, etc.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is a simplified block diagram illustrating a system 100 for providing communication between applications and television. Referring now to FIG. 1, the system 100 may comprise a plurality of applications 114. The plurality of applications 114 may include various types of applications. For example, applications 114 may include a food application (Application A) 114A, a news application (Application B) 114B, a fitness application (Application C) 114C, a calendar application (Application D) 114D, television programming application (Application E) 114E, and a music application (Application N) 114N. As should be appreciated, the applications 114A-N illustrated in FIG. 1 are but a few examples of various types of applications that may be included. The applications 114 may reside locally on a computing device 102, 106, 108, 110, 112 or alternatively, may reside on a remote server and be accessed by one or more computing devices 102, 106, 108, 110, 112 by way of a network (e.g., Internet, hybrid fiber coax (HFC) network, etc.). Computing devices may include, but are not limited to, a functionally network-connected television, such as an Internet Protocol television (IPTV) or an interactive television 102, a networked receiving and decoding device, such as a set-top box (STB) 106, which will be described in greater detail with reference to FIG. 7, a mobile communications device 108, such as a cell phone, smart phone, etc., a computing device 110, such as a desktop computer, laptop computer, gaming device, etc., and/or a tablet computing device 112.

According to embodiments, the IPTV or an interactive television 102 or a STB 106 functionally connected to a television 104 (herein referred to as TV 116) may communicate with one or more of the plurality of applications 114 by way of a virtual communication bus 124. The virtual communication bus 124 provides a standard framework for applications 114 to communicate with each other and with a TV 116.

As illustrated in FIG. 1, the system 100 may also include a communal memory 118 operable to store data 120,122 from the applications 114 and the TV 116. According to embodiments, the data 120,122 may be stored in a standard format. By storing the data 120,122 in a standard format, any of the applications 114 on the virtual communication bus 124 and the TV 116 may access the data 120,122 and may be able to utilize the data 120,122 to provide relevant information to a user. According to embodiments, relevant information may include passive knowledge, suggestions and/or recommendations to the user. The data 120,122 will be described in more detail below with reference to FIG. 2.

Referring now to FIG. 2, applications 114, TV 116, and the communal memory 118 are shown connected to the virtual communication bus 124. When a user accesses media content on a TV 116 (IPTV or interactive television 102 or a television 104 functionally connected to a receiving and decoding device, such as a STB 106), data 120E about the media content and machine learning data 122 may be stored in the communal memory 118 in a standard format. TV data 120E may include data and metadata such as, but not limited to, application data 202 (e.g., application type, application identifier, etc.), a time-stamp 204, location information 206, receiving device 208, keywords 210, other metadata (e.g., genre, actors, producer, director, etc.), etc. Machine learning data 122 may include data associated with how a user interacts with information provided by an application 114. For example and as illustrated in FIG. 2, a user may choose to watch a television program about travelling to Peru on a television 104 functionally connected to a receiving and decoding device, such as a STB 106. The STB 106 may be connected to a virtual communication bus 124 and may be operable to provide a television programming application 114E. When the television program is provided to the user, data 120E about the media content and data 122 associated with how the user interacts with the television program may be stored in a standard format in the communal memory 118. For example, time-stamp data 204 may be stored, providing information that the media content was accessed by the user on Jan. 3, 2020 at 12:02 PM. Location data 204 may be stored, providing information that the user accessed the media content from a home network. Device data 206 may be stored, providing information that the user accessed the media content via a STB 106. Additionally, keyword data 210 may be stored, providing words, names, phrases, and other terms extracted from the media content or provided with the media content. According to this example, keywords may include the terms "travel" and "Peru." As should be appreciated, communal memory 118 may store more or other types of data 120E than time stamp data 204, location data 206, device data 208, keyword data 210, and machine learning data 122 associated with media content accessed via the TV 116.

The standard format data 120E,122 may be pushed to or pulled by one or more of the plurality of applications 114 on the virtual communication bus 124. An application 114 may utilize the standard format data 120E,122 to provide information relevant to the television program the user is watching. For example, a food application (Application A) 114A may provide information about Peruvian dishes, a news application (Application B) 114B may provide the latest news headlines in Peru, a music application (Application N) 114N may provide Peruvian music, etc.

Figure 3A:
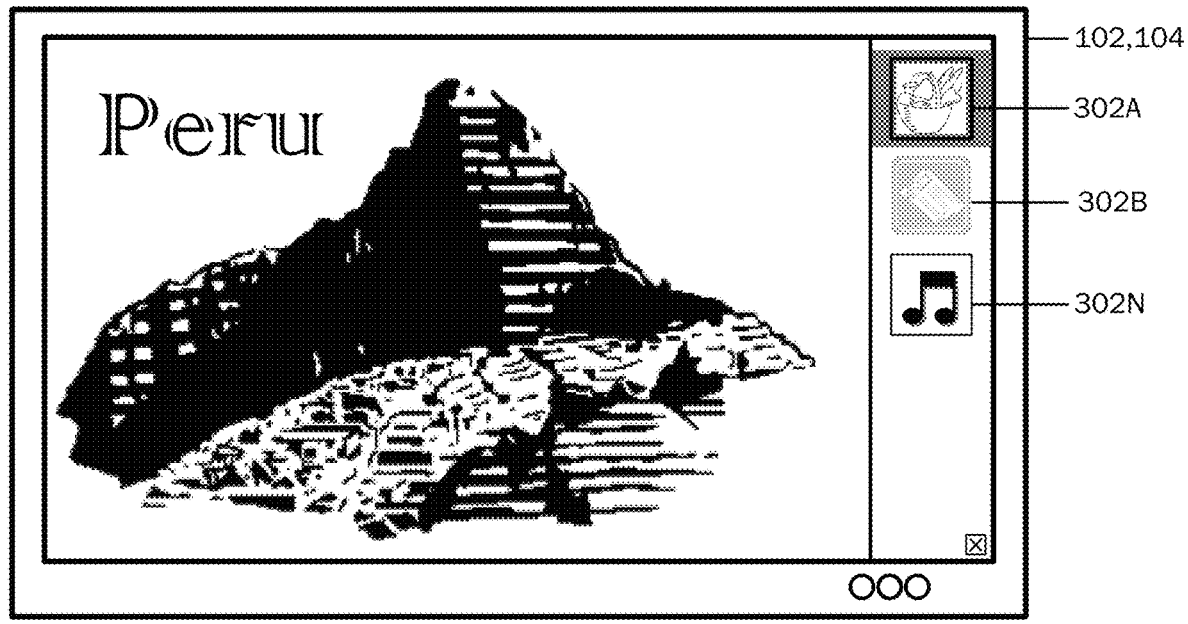
FIG. 3A illustrates examples of widgets displayed on a television.
Figure 3B:
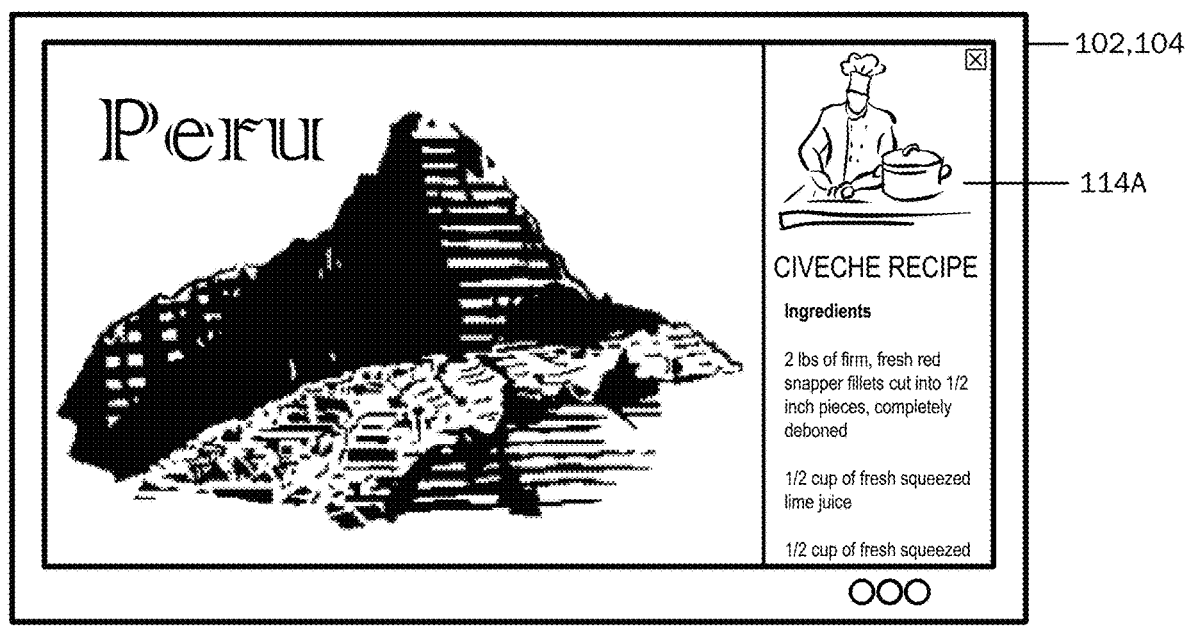
FIG. 3B illustrates an example application displayed on a television.

The applications 114 may provide the information via one or more of computing devices 102, 106, 108, 110, 112. According to one embodiment and as illustrated in FIG. 3A, one or more selectable user interface widgets 302 associated with one or more applications 114 may be presented on a display of the television 102,104, which when selected, may access the corresponding application 114 on the interactive television 102 or STB 106. For example, a widget 302A for the food application (Application A) 114A, a widget 302B for the news application (Application B) 114B, and a widget 302N of the music application (Application N) 114N may be provided. A user may select a widget 302, for example the widget 302A for the food application (Application A) 114A. Accordingly, as shown in FIG. 3B, the food application (Application A) 114A may be provided on the display. For example, the application 114A may provide information about a recipe for a popular Peruvian dish. The application 114A may be provided in a split-screen as shown, or alternatively, may be provided in a mosaic along with other selected applications 114.

According to embodiments, the standard format data stored in the communal memory 118 may include TV data 120E, other application data 120, and machine learning data 122. Similar to when a user accessed media content on a TV 116, when a user accesses an application 114, data 120 about the information provided to the user via the application 114 and data 122 about the information the user interacts with via the application 114 may be stored in a standard format in the communal memory 118. For example and referring back to FIG. 2, a user may utilize a news application 114B to access information about a presidential election. The user may utilize the news application 114B on one of various devices 102, 106, 108, 110, 112. Accordingly, data such as time-stamp data 204 providing information about the date and time the application 114B is accessed, location data 204 providing information about which network is utilized to access the application 114B, device data 206 providing information about on which device the user accesses the application 114B, and keyword data 210 providing words, names, phrases, and other terms extracted from the application information or provided with the application content may be stored in the communal memory 118. Additionally, machine learning data 122 may be stored in the communal memory 118. The machine learning data 122 may include data associated with how the user interacts with information provided by an application 114. For example, if a user does not interact with information determined to be relevant to the user and provided by an application 114 (e.g., closes the application 114 within a predetermined amount of time), data associated with the user's lack of interaction with the information may be stored in the communal memory 118. Machine learning data 122 may be utilized to provide more relevant information to a user. As should be appreciated, communal memory 118 may store more or other types of data 120 than time stamp data 204, location data 206, device data 208, keyword data 210, and machine learning data 122 associated with an application 114.

Application data 120 and machine learning data 122 stored in the communal memory 118 may be accessed via one or more of the plurality of applications 114 on the virtual communication bus 124. The standard format application data 120 and machine learning data 122 may be pushed to or pulled by one or more of the plurality of applications 114. An application 114 may utilize the standard format application data 120 and machine learning data 122 to provide information relevant to the content interacted with via the accessed application 114.

Continuing with the example, consider that the user accesses the application 114B on a tablet computing device 112 on a virtual communication bus 124 as illustrated in FIG. 4. Data 120 extracted from the content provided by the application 114B and data 122 extracted from the user's interaction with the content accessed via the application 114B may be stored in the communal memory 118. According to this example, keyword data 210 may be included in the data 120 extracted from the content provided by the application 114B and may include terms such as "election" and "president." The user may be watching content on a TV 116 while interacting with the application 114B on the tablet computing device 112. The TV 116 may be an IPTV or an interactive television 102 or a television 104 functionally connected to a networked receiving and decoding device, such as a STB 106. The standard format data 120 including the keyword data 210 may be pushed to or pulled by a television programming application 114E running on the TV 116 on the virtual communication bus 124. Accordingly, media content relevant to information provided by the application 114B may be suggested to the user via the television programming application 114E utilizing the standard format data 120 and the machine learning data 122. The television programming application 114E on the TV 116 may also utilize media content guide data to determine available media content to suggest to the user. For example, the application 114E may make a determination that the user may be interested in media content related to the keyword data 210 "election" and "president," search for available media content related to the keyword data 210, and suggest the media content to the user. Media content may be suggested via various methods. For example, an indication of suggested content may be displayed on the display of the TV 116 or may be communicated to the user via other notification methods. The user may choose to select the suggested content and accordingly, the media content may be provided to the user as shown in FIG. 4.

Figure 5:
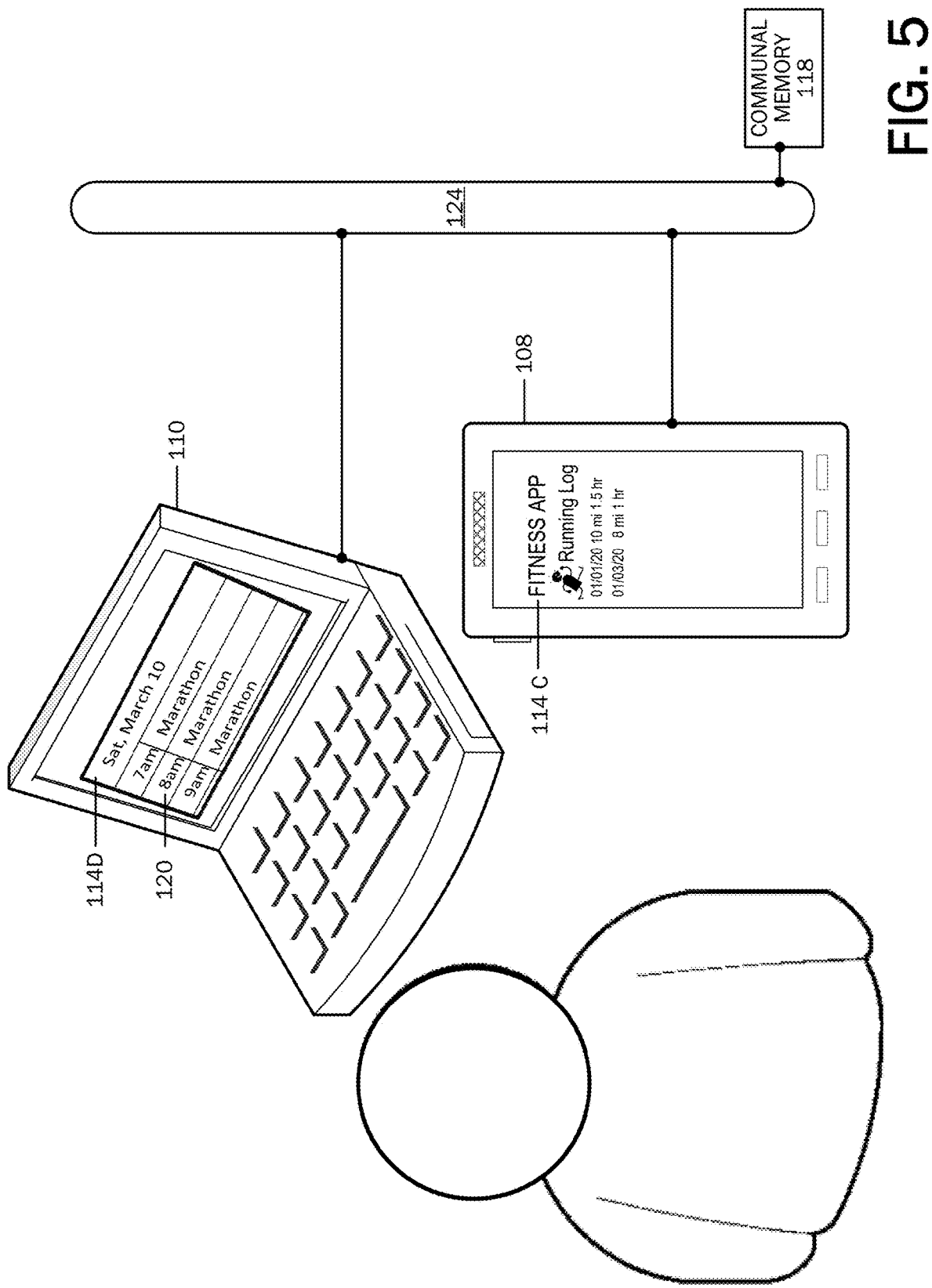
FIG. 5 illustrates an example of sharing of information between a calendar application and a fitness application.

According to an embodiment, data 120 associated with a calendar application 114D may be stored in a communal memory 118 and accessed by other applications 114. Referring now to FIG. 5, a calendar application 114D is shown displayed on a laptop computing device 110 and connected to a virtual communication bus 124. Data 120, such as calendar events, meetings, appointments, and other calendar items associated with the calendar application 114D may be stored in the communal memory 118 in a standard format. The standard format calendar application data 120 may be pushed to or pulled by one or more of the plurality of applications 114. For example and as illustrated in FIG. 5, a fitness application 114C running on a mobile communication device 108 may access the calendar application data 120 and use the access data 120 to provide information relevant to the calendar application data 120. For example, if the calendar application data 120 includes a calendar item for a marathon, the word "marathon" and the dates associated with the word "marathon" may be stored in the communal memory 118. The fitness application 114C may receive the stored calendar application data 120 and determine relative information to provide the user. For example, if the user accesses the fitness application 114C, a running log may be determined as relative to the user and provided to the user to track his running progress in preparation for the marathon. The user may interact with the fitness application 114C, for example, the user may log his run distance and times in the fitness application. Accordingly, the information entered into the fitness application 114C by the user may be stored in the communal memory 118 in a standard format and may be used by other applications 114.

Figure 6:
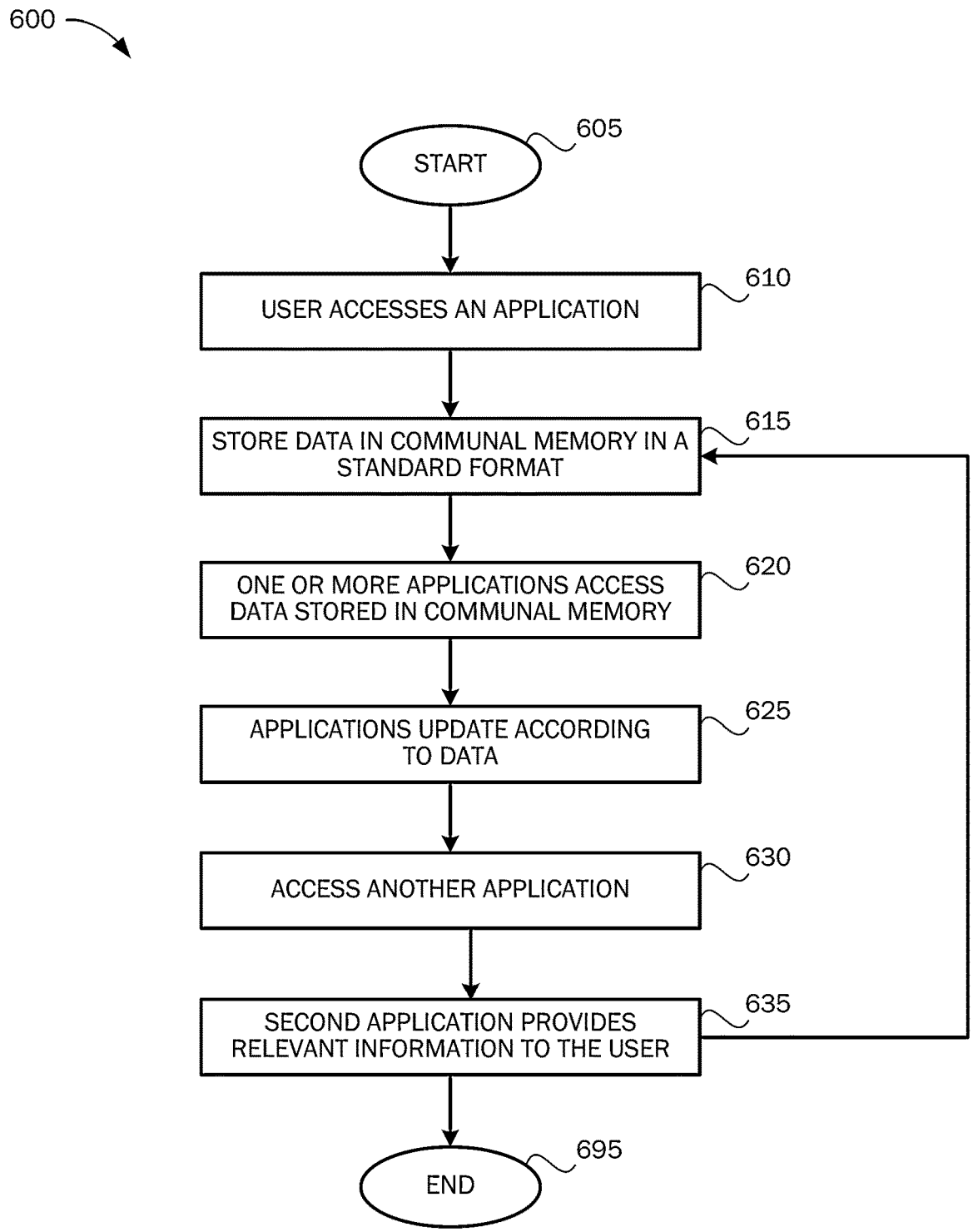
FIG. 6 is a flow chart of a method for sharing information via a virtual communication bus according to an embodiment.

FIG. 6 is a flow chart of a method 600 for providing a standard framework for an application to communicate with a television and other applications and to receive relevant information from the television and other applications according to an embodiment. The method 600 starts at OPERATION 605 and proceeds to OPERATION 610 where an application 114 on a virtual communication bus 124 is utilized by a user. As described above, the application 114 may be one of various types of applications and may reside locally on a computing device 102, 106, 108, 110, 112 or alternatively, may reside on a remote server and be accessed by one or more computing devices 102, 106, 108, 110, 112 by way of a network (e.g., Internet, hybrid fiber coax (HFC) network, etc.). For example, applications 114 may include, but are not limited to, a food application (Application A) 114A, a news application (Application B) 114B, a fitness application (Application C) 114C, a calendar application (Application D) 114D, a television programming application (Application E) 114E, and a music application (Application N) 114N.

At OPERATION 615, data 120,122 from the application 114 on a virtual communication bus 124 is stored in a communal memory 118 on the virtual communication bus 124 in a standard format. According to embodiments, the data 120,122 may include machine learning data 122 and data and metadata such as, but not limited to, application data 202, a time-stamp 204, location information 206, receiving device 208, keywords 210, other metadata (e.g., genre, actors, producer, director, etc.), etc. associated with information provided by an application 114, information provided by an application 114 that a user interacts with, and/or information provided to an application 114 by a user. The communal memory 118 may be accessed by any application 114 on the virtual communication bus 124, including a television programming application 114E.

At OPERATION 620 one or more of the plurality of applications 114 on the virtual communication bus 124 may access the data 120,122 stored in the communal memory 118. The stored data 120,122 may be pushed to or pulled by one or more of the plurality of applications 114. For example, the stored data 120,122 may be pushed to one or more of the applications 114 when new data is added to the communal memory 118 or may be pushed to one or more of the applications 114 according to a time interval. Alternatively, the stored data 120,122 may be pulled by one or more of the applications 114 according to a time interval or when an application 114 is accessed.

At OPERATION 625, the one or more applications 114 may determine relevant information based on the received stored data 120,122 and may update accordingly. For example, the one or more applications 114 may determine information to provide to a user based on one or more of application data 202, time-stamp data 204, location information 206, a receiving device 208, keywords 210, other metadata (e.g., genre, actors, producer, director, etc.), etc.

At OPERATION 630, the user may access a second application 114 on the virtual communication bus 124. The application 114 may be accessed on the same device 102, 104, 106, 108, 110, 112 utilized to access the first application 114, or alternatively, may be accessed on a different device 102, 104, 106, 108, 110, 112 operable to run an application 114 on the virtual communication bus 124. The second application 114 may be provided automatically (e.g., automatic Internet search, pop-up notification, etc.) or may be selected by the user.

The method 600 proceeds to OPERATION 635 where information determined to be relevant to the user based on the data 120 stored in a standard format in the communal memory 118 is provided to the user. The method 600 may return to OPERATION 615 where data 120,122 associated with information provided by the second application 114, information provided by the second application 114 that the user interacts with, and/or information provided to the second application 114 by the user is stored in the communal memory 118 on the virtual communication bus 124 in a standard format.

According to embodiments, data 120,122 from a plurality of applications 114 may be pushed to or pulled by an application 114 to provide relevant information to a user. For example, a sports application may store data on skiing, and a calendar application may provide information about a user's schedule including a period of time the user does not have any scheduled appointments or meetings. Accordingly, a travel application may receive this data and provide a suggestion for a trip to a ski resort in Colorado during the time period the user has free. The method 600 may end at OPERATION 695.

Figure 7:
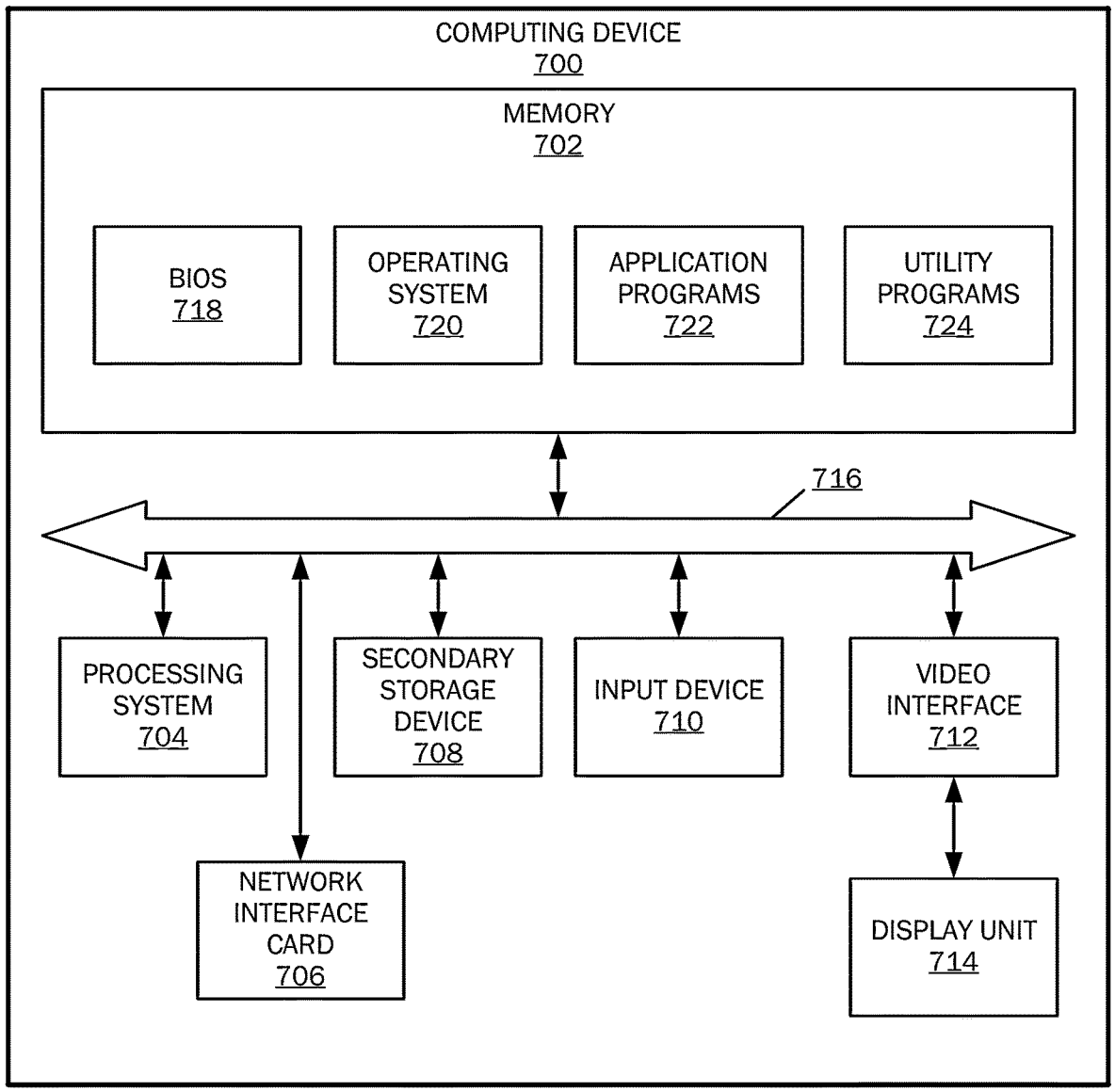
FIG. 7 is a block diagram illustrating example physical components of a computing device with which embodiments may be practiced.

FIG. 7 is a block diagram illustrating example physical components of a computing device 700 with which embodiments may be practiced. In some embodiments, one or a combination of the components the virtual communication bus 124 and the communal memory 118 may be implemented using one or more computing devices like the computing device 700. It should be appreciated that in other embodiments, the virtual communication bus 124 and the communal memory 118 may be implemented using computing devices having hardware components other than those illustrated in the example of FIG. 7.

Computing devices may be implemented in different ways in different embodiments. For instance, in the example of FIG. 7, the computing device includes a processing system 704, memory 702, a network interface 706, a secondary storage device 708, an input device 710, a video interface 712, a display unit 714, and a communication medium 716. In other embodiments, the computing device 700 may be implemented using more or fewer hardware components (e.g., a video interface, a display unit, or an input device) or in combination with other types of computer systems and program modules.

The memory 702 includes one or more computer-readable storage media capable of storing data and/or computer-executable instructions. According to one embodiment, one or more applications 114 may be stored locally on computing device 700. Memory 702 thus may store the computer-executable instructions that, when executed by processor 704, share information via a virtual communication bus 124 as described above with reference to FIGS. 1-6.

In various embodiments, the memory702 is implemented in various ways. For example, the memory702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system704 includes one or more processing units, which may include tangible integrated circuits that selectively execute computer-executable instructions. In various embodiments, the processing units in the processing system704 are implemented in various ways. For example, the processing units in the processing system704 can be implemented as one or more processing cores. In this example, the processing system704 can comprise one or more Intel Core microprocessors. In another example, the processing system704 can comprise one or more separate microprocessors. In yet another example embodiment, the processing system704 can comprise Application-Specific Integrated Circuits (ASICs) that provide specific functionality. In yet another example, the processing system704 provides specific functionality by using an ASIC and by executing computer-executable instructions.

The computing device700 may be enabled to send data to and receive data from a communication network via a network interface card706. In different embodiments, the network interface card706 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be a an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 that, when executed by the processing system 704, cause the computing device 700 to provide applications to users, for example, applications 114. The memory 702 also stores one or more utility programs 724 that, when executed by the processing system 704, cause the computing device 700 to provide utilities to other software programs. Embodiments of the present invention may be utilized in various distributed computing environments where tasks are performed by remote processing devices that are linked through a communications network in a distributed computing environment.

Figure 8:
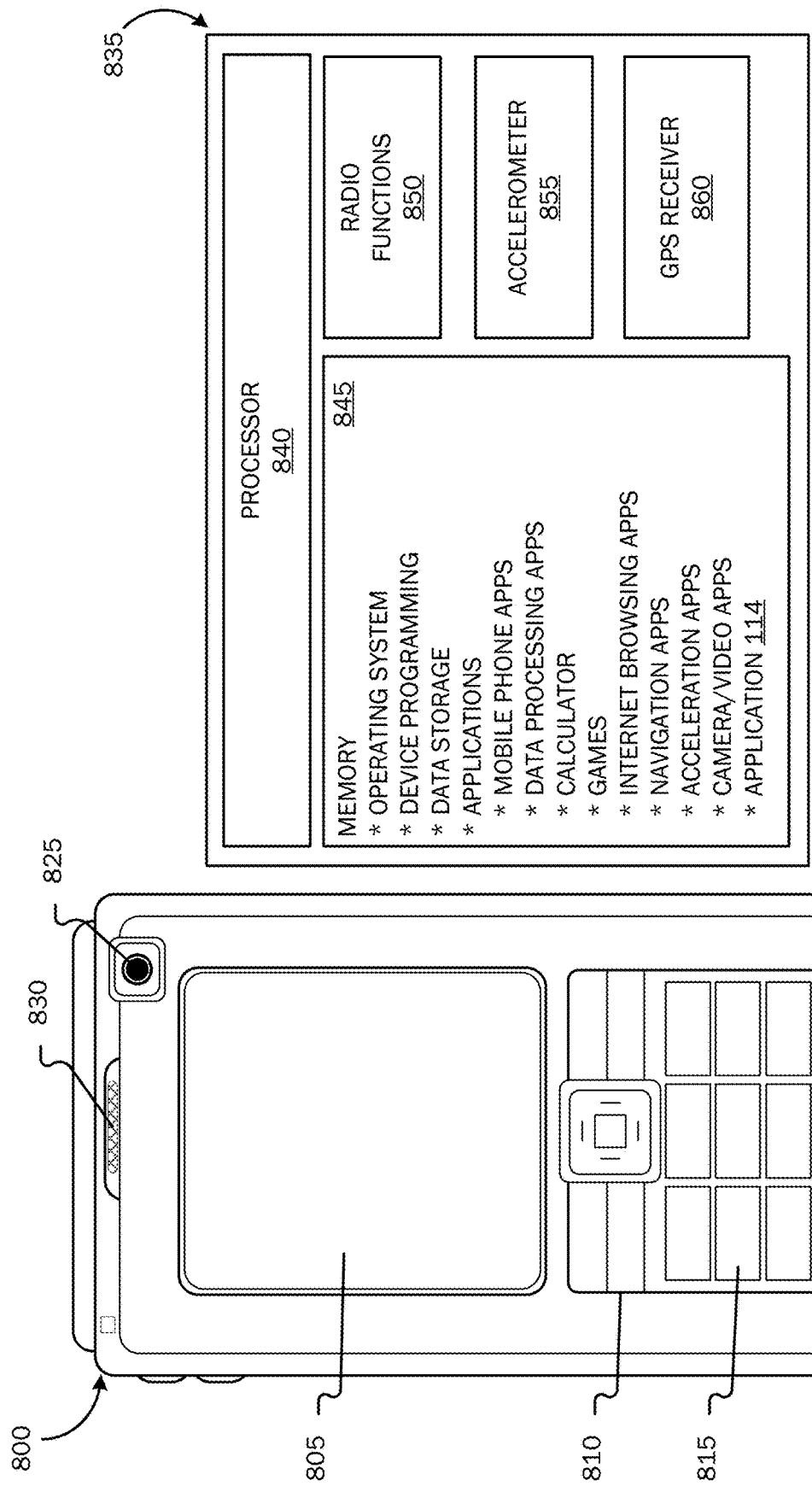
FIGS. 8A-8B illustrate a suitable mobile computing environment with which embodiments may be practiced.

FIGS. 8A-8B illustrate a suitable mobile computing environment, for example, a mobile computing device 800, a smart phone, a tablet personal computer, a laptop computer, and the like, with which embodiments may be practiced. The mobile computing device 800 is illustrative of any suitable device operative to send, receive and process wireless communications according to embodiments of the present invention. A display screen 805 is operative for displaying a variety of information such as information about incoming and outgoing communications, as well as, a variety of data and displayable objects, for example, text, alphanumeric data, photographs, and the like.

Data input to the device 800 may be performed via a variety of suitable means, such as, touch screen input via the display screen 805, keyboard or keypad input via a data entry area 810, key input via one or more selectable buttons or controls 815, voice input via a microphone 818 disposed on the device 800, photographic input via a camera 825 functionality associated with the mobile computing device, or any other suitable input means. Data may be output via the device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a general purpose computer processor for processing incoming and outgoing data and communications and controlling operation of the device and associated software applications via a mobile computing device operating system. Memory 845 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, one or more components of applications 114 may be stored locally on mobile computing device 800.

Mobile computing device 800 may contain an accelerometer 855 for detecting acceleration, and can be used to sense orientation, vibration, and/or shock. Mobile computing device 800 may contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the device 800 to communicate with other communication devices and systems via a wireless network. Radio functions 850 may be utilized to communicate with a wireless or WIFI-based positioning system to determine a device's 800 location.

Figure 9:
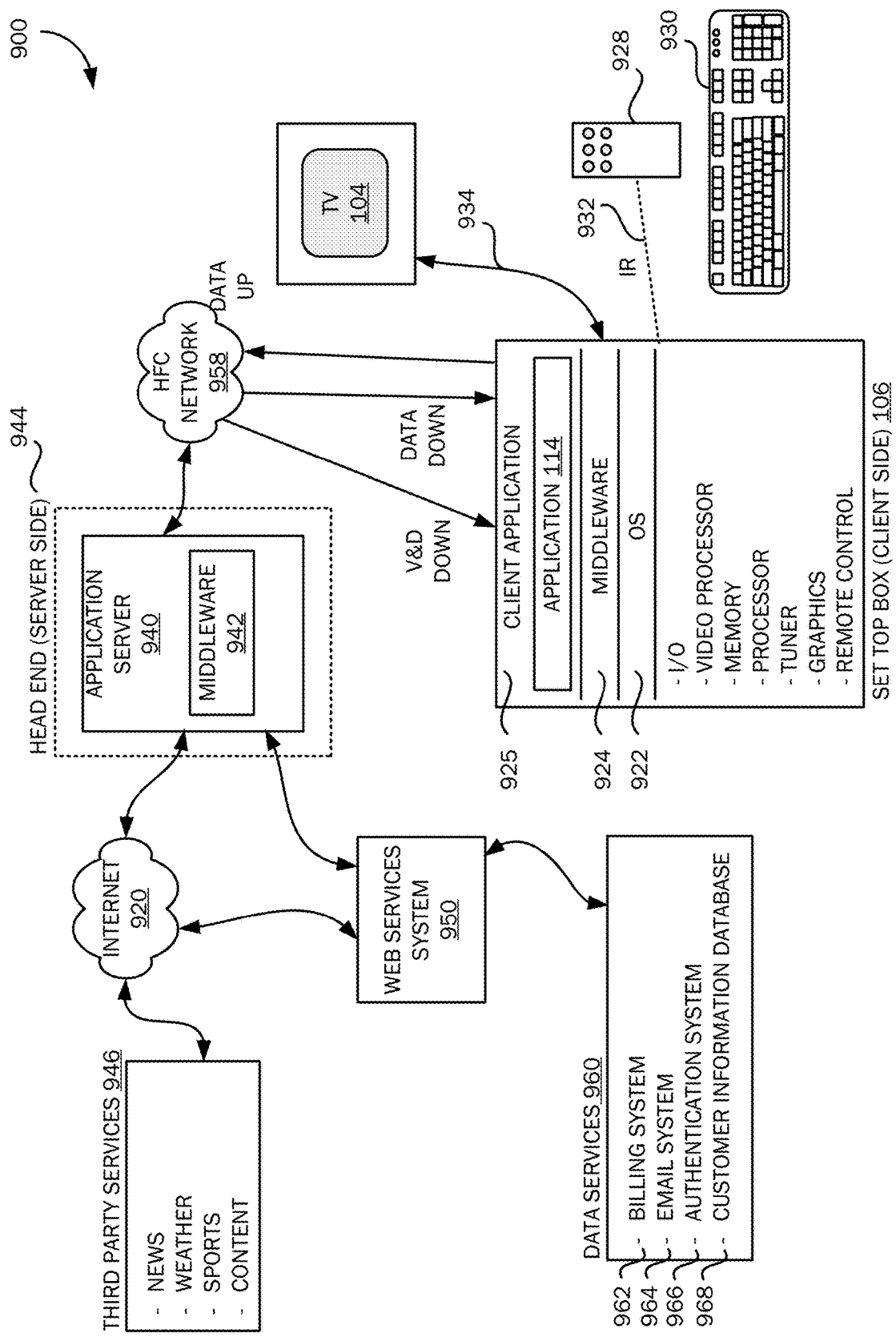
FIG. 9 is a simplified block diagram illustrating a cable television services system architecture providing an operating environment according to an embodiment.

FIG. 9 is a simplified block diagram illustrating a cable television services system 900 (hereafter referred to as "CATV") architecture providing an operating environment according to an embodiment. As can be appreciated, a CATV architecture is but one of various types of systems that may be utilized to share information via a virtual communication bus 124. Referring now to FIG. 9, digital and analog video programming, information content and interactive television services are provided via a hybrid fiber coax (HFC) network 958 to a television set 102,104 for consumption by a cable television/services system customer. As is known to those skilled in the art, HFC networks 958 combine both optical fiber and coaxial cable lines. Typically, optical fiber runs from the cable head end 944 to neighborhoods of subscribers. Coaxial cable runs from the optical fiber feeders to each customer or subscriber. The functionality of the HFC network 958 allows for efficient bidirectional data flow between the client-side set-top box 106 and a server-side application server 940.

The CATV system 900 is in the form of a distributed client-server computing system for providing video and data flow across the HFC network 958 between server-side services providers (e.g., cable television/services providers) via a server-side head end 944 and a client-side customer via a client-side set-top box (STB) 106 functionally connected to a customer receiving device, such as the television set 104. According to embodiments, a STB 106 may be integrated with a television 102. As is understood by those skilled in the art, modern CATV systems 900 may provide a variety of services across the HFC network 958 including traditional digital and analog video programming, telephone services, high speed Internet access, video-on-demand, and information services.

On the client side of the CATV system 900, digital and analog video programming and digital and analog data are provided to the customer television set 104 via the set-top box (STB) 106. Interactive television services that allow a customer to input data to the CATV system 900 likewise are provided by the STB 106. As illustrated in FIG. 9, the STB 106 is a multipurpose computing device having a computer processor, memory, and an input/output mechanism. The input/output mechanism receives input from server-side processes via the HFC network 958 and from customers via input devices such as the remote control device 928, keyboard 930, or other computing device, such as a tablet/slate computer 112, smart phone 108, etc. The remote control device 928 and the keyboard 930 may communicate with the STB 106 via a suitable communication transport such as the infrared connection 932. The STB 106 also includes a video processor for processing and providing digital and analog video signaling to the television set 104 via a cable communication transport 934. A multi-channel tuner is provided for processing video and data to and from the STB 106 and the server-side head end system 944, described below.

The STB 106 also includes an operating system 922 for directing the functions of the STB 106 in conjunction with a variety of client applications 925. For example, if a client application 925 requires a news flash from a third-party news source to be displayed on the television 104, the operating system 922 may cause the graphics functionality and video processor of the STB 106, for example, to output the news flash to the television 104 at the direction of the client application 925 responsible for displaying news items. According to embodiments, client application 925 may include one or more of applications 114.

Because a variety of different operating systems 922 may be utilized by a variety of different brands and types of set-top boxes, a middleware layer 924 may be provided to allow a given software application to be executed by a variety of different operating systems. According to an embodiment, the middleware layer 924 may include a set of application programming interfaces (APIs) that are exposed to client applications 925 and operating systems 922 that allow the client applications to communicate with the operating systems through common data calls understood via the API set. As described below, a corresponding middleware layer is included on the server side of the CATV system 900 for facilitating communication between the server-side application server and the client-side STB 106. The middleware layer 942 of the server-side application server and the middleware layer 924 of the client-side STB 106 may format data passed between the client side and server side according to the Extensible Markup Language (XML).

According to one embodiment, the set-top box 106 passes digital and analog video and data signaling to the television 104 via a one-way communication transport 934. According to other embodiments, two-way communication transports may be utilized, for example, via high definition multimedia (HDMI) ports. The STB 106 may receive video and data from the server side of the CATV system 900 via the HFC network 958 through a video/data downlink and data via a data downlink. The STB 106 may transmit data from the client side of the CATV system 900 to the server side of the CATV system 900 via the HFC network 958 via one data uplink. The video/data downlink is an "in band" downlink that allows for digital and analog video and data signaling from the server side of the CATV system 900 through the HFC network 958 to the set-top box 106 for use by the STB 106 and for distribution to the television set 104. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 1, between the HFC network 958 and the set-top box 106 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 106 and the server-side application server 940 is typically passed through the "out of band" data links. Alternatively, an "in band" data carousel may be positioned in an "in band" channel into which a data feed may be processed from the server-side application server 940 through the HFC network 958 to the client-side STB 106. Operation of data transport between components of the CATV system 900 is well known to those skilled in the art.

Referring still to FIG. 9, the head end 944 of the CATV system 900 is positioned on the server side of the CATV system and includes hardware and software systems responsible for originating and managing content for distributing through the HFC network 958 to client-side STBs 106 for presentation to customers via televisions 104. As described above, a number of services may be provided by the CATV system 900, including digital and analog video programming, interactive television services, telephone services, video-on-demand services, targeted advertising, and provision of information content.

The application server 940 is a general-purpose computing system operative to assemble and manage data sent to and received from the client-side set-top box 106 via the HFC network 958. As described above with reference to the set-top box 106, the application server 940 includes a middleware layer 942 for processing and preparing data from the head end of the CATV system 900 for receipt and use by the client-side set-top box 106. For example, the application server 940 via the middleware layer 942 may obtain data from third-party services 946 via the Internet 920 for transmitting to a customer through the HFC network 958 and the set-top box 106. For example, content metadata a third-party content provider service may be downloaded by the application server via the Internet 920. When the application server 940 receives the downloaded content metadata, the middleware layer 942 may be utilized to format the content metadata for receipt and use by the set-top box 106. Therefore, content metadata may be sent and categorized based on the availability to the customer's program guide data.

According to one embodiment, data obtained and managed by the middleware layer 942 of the application server 940 is formatted according to the Extensible Markup Language and is passed to the set-top box 106 through the HFC network 958 where the XML-formatted data may be utilized by a client application 925 in concert with the middleware layer 924, as described above. As should be appreciated by those skilled in the art, a variety of third-party services data, including news data, weather data, sports data and other information content may be obtained by the application server 940 via distributed computing environments such as the Internet 920 for provision to customers via the HFC network 958 and the set-top box 106.

According to embodiments, the application server 940 obtains customer support services data, including billing data, information on customer work order status, answers to frequently asked questions, services provider contact information, and the like from data services 960 for provision to the customer via an interactive television session. As illustrated in FIG. 9, the services provider data services 960 include a number of services operated by the services provider of the CATV system 900 which may include data on a given customer.

A billing system 962 may include information such as a customer's name, street address, business identification number, Social Security number, credit history, and information regarding services and products subscribed to by the customer. According to embodiments, the billing system 962 may also include billing data for services and products subscribed to by the customer for bill processing, billing presentment and payment receipt.

A customer information database 968 may include general information about customers such as place of employment, business address, business telephone number, and demographic information such as age, gender, educational level, and the like. The customer information database 968 may also include information on pending work orders for services or products ordered by the customer. The customer information database 968 may also include general customer information such as answers to frequently asked customer questions and contact information for various service provider offices/departments. As should be understood, this information may be stored in a variety of disparate databases operated by the cable services provider.

Referring still to FIG. 9, web services system 950 is illustrated between the application server 940 and the data services 960. According to embodiments, web services system 950 serves as a collection point for data requested from each of the disparate data services systems comprising the data services 960. According to embodiments, when the application server 940 requires customer services data from one or more of the data services 960, the application server 940 passes a data query to the web services system 950. The web services system formulates a data query to each of the available data services systems for obtaining any required data for a requesting customer as identified by a set-top box identification associated with the customer. The web services system 950 serves as an abstraction layer between the various data services systems and the application server 940. That is, the application server 940 is not required to communicate with the disparate data services systems, nor is the application server 940 required to understand the data structures or data types utilized by the disparate data services systems. The web services system 950 is operative to communicate with each of the disparate data services systems for obtaining necessary customer data. The customer data obtained by the web services system is assembled and is returned to the application server 940 for ultimate processing via the middleware layer 942, as described above.

An authentication system 966 may include information such as secure user names, subscriber profiles, subscriber IDs, and passwords utilized by customers for access to network services. As should be understood by those skilled in the art, the disparate systems 962, 964, 966, 968 may be integrated or provided in any combination of separate systems, wherein FIG. 9 shows only one example.

Embodiments the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-9. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for providing relevant content to a user related to content currently being accessed by the user by sharing data in a standard format via a virtual communication bus, the system comprising:
   a plurality of user devices comprising at least a first user device and a second user device, the first user device and the second user device are being simultaneously accessed by the user;
   a plurality of applications utilized by the user to access content and the relevant content, the plurality of applications including at least a first application operating on the first user device and a second application operating on the second user device, wherein the first application is active on a first user device by which the content is currently being accessed by the user;
   the virtual communication bus operating to transfer data between the plurality of applications; and
   a single communal memory, wherein each of the plurality of applications stores data and metadata in the single communal memory in the standard format, the stored data and metadata being associated with the content accessed by the user via each of the plurality of applications,
   wherein the data and metadata comprise one or more of application type, application identifier, time-stamp data, location information, receiving device data, keyword data, and machine learning data, wherein the machine learning data may include data associated with how the user interacts with information provided by each of the plurality of applications,
   wherein the first and second user devices access the plurality of applications and the single communal memory through the virtual communication bus,
   wherein the first application on the first user device stores new content related to the interaction of the user with the first application in the single communal memory in the standard format, including data and metadata associated with the new content,
   wherein the second application being used on the second user device identifies the new content stored in the single communal memory by the first application based on the data and metadata associated with the new content,
   wherein the second application, utilizing the data and metadata stored in the single communal memory, automatically determines the relevant content in which the user may be interested, the relevant content related to the content currently being accessed by the user,
   wherein the second application searches the stored data and metadata including the data and metadata associated with the new content in the single communal memory for the relevant content, and suggests the relevant content to the user via the second user device, and
   wherein a selectable indicator is displayed on the second user device indicating the relevant content is available for access.

2. The system of claim 1, wherein the plurality of applications further provide data associated with interactions from the user related to the new content.

3. The system of claim 2, wherein the single communal memory further stores the data associated with the user's interaction with the new content.

4. The system of claim 3, wherein the plurality of applications further utilize the data associated with the content provided by the first application and the data and metadata associated with interactions from the user related to the new content provided by the plurality of applications to determine and provide further relevant content to the user.

5. The system of claim 1, wherein the first application provides data associated with content accessed by the user.

6. The system of claim 5, wherein the first application runs on an interactive television or a set top box connected to a television.

7. The system of claim 1, wherein the metadata further comprises one or more of:
   genre,
   actors,
   producer, and
   director.

8. The system of claim 1, wherein the plurality of applications are accessed via one or more computing devices.

9. The system of claim 8, wherein one or more computing devices comprises one or more of:
   an interactive television;
   a set top box functionally connected to a television;
   a mobile communication device;
   a computing device; or
   a tablet computing device.

10. A memory having computer-executable instructions for providing relevant content to a user related to content currently being accessed by the user via a first user device by sharing data in a standard format, the instructions, when executed by a processor, provide for:
    storing data and metadata as new content in a single communal memory in a standard format, the data and metadata being associated with content being accessed by the user on the first user device via a first application,
    wherein the stored data and metadata comprise one or more of application type, application identifier, time-stamp data, location information, receiving device data, keyword data, and machine learning data, wherein the machine learning data may include data associated with how the user interacts with information provided by the first application;
    wherein a second application being used on a second user device, utilizing the data and metadata stored in the single communal memory, automatically determines the relevant content in which the user may be interested, the relevant content related to the content currently being accessed by the user;
    searching the new content stored in the single communal memory, based on the data and the metadata associated with the stored new content, by the second application currently being used by the user on the second user device for the relevant content that may be of interest to the user based on content currently being accessed by the user via the first application on the first user device;
    providing a selectable user interface widget on the second user device currently being accessed by the user via the second application, wherein the widget is associated with the second application and corresponds to the relevant content to provide to the user based on the content currently being accessed by the user via the first application; and
    in response to receiving a selection of the widget by the user:

extracting stored data and metadata of the relevant content from the single communal memory, the extracted data and metadata being associated with the content currently being accessed by the user via the first application;

providing the extracted data and metadata from the single communal memory to the second application on the second user device while the user is utilizing the first application; and displaying the relevant content associated with the extracted data and metadata to the user on the second user device.

11. The memory of claim 10, further comprising:

providing a second selectable user interface widget on the first user device displaying the content currently being accessed by the user, wherein the second widget is associated with a third application and corresponds to a second type of relevant content to provide the user;

providing the stored data and metadata to the third application to enable the third application to determine further relevant content corresponding to the second type of relevant content to provide to the user;

receiving a selection of the second widget; and in response to the selection of the second widget, providing the further relevant content corresponding to the second type of relevant content to the user in a split screen arrangement on the second user device with the content currently being accessed by the user.

12. The memory of claim 11, wherein the relevant content and the further relevant content are displayed together as a mosaic arrangement in the split screen arrangement on the second user device.

13. The memory of claim 11, further comprising:

in response to providing the further relevant content corresponding to the second type of relevant content to the user, storing data associated with the further relevant content corresponding to the second type of relevant content in the single communal memory; and wherein providing the stored data and metadata to the first application and the second application includes providing the data and metadata associated with the further relevant content corresponding to the second type of relevant content.

14. A method, implemented by a computing device, for providing relevant content related to content currently being accessed by a user via a first application on a first user device by sharing data in a standard format, the method comprising:

identifying data and metadata associated with content currently being accessed by a user utilizing the first application on the first user device;

extracting the data and metadata associated with the content currently being accessed by the user utilizing the first application on the first user device, wherein the data and metadata comprise one or more of application type, application identifier, time-stamp data, location information, receiving device data, keyword data, and machine learning data, wherein the machine learning data may include data associated with how the user interacts with information provided by the first application;

storing the extracted data and metadata and the content in the standard format in a single communal memory, wherein the single communal memory is accessible by the first application and a second application;

identifying stored data and metadata in the single communal memory that is related to content currently being accessed by the user via the first application;

wherein the second application, utilizing the data and metadata stored in the single communal memory, automatically determines the relevant content in which the user may be interested, the relevant content related to the content currently being accessed by the user, wherein the second application searches the single communal memory for and suggests the relevant content to the user via the second application based on the content currently being accessed by the user, and wherein an indicator for suggesting the relevant content is displayed on the second user device utilizing the second application for selection by the user to access the relevant content.

15. The method of claim 14, wherein the first application is a television programming application running on the first user device comprising a Set Top Box in communication with a television.

16. The method of claim 15, wherein identifying content accessed by the user on the first user device comprises receiving an indication of television programming viewed via the television.

17. The method of claim 14, further comprising providing the extracted data and metadata to one or more other applications running on one or more other computing devices.

18. The method of claim 14, wherein the metadata further comprises at least one of:

genre, actors, producer, and director.

19. The method of claim 18, wherein the the first application provides data associated with interactions from the user while accessing content.

20. The method of claim 14, further comprising:

identifying second content accessed via a third application on the first user device;

storing second data and metadata related to the second content accessed via the third application in the standard format on the single communal memory;

in response to receiving a second interaction from the first application, identifying further relevant content related to the second data and metadata; and providing the further relevant content for access via the second application on the second user device.

* * * * *